(12) United States Patent
Hassanpour

(10) Patent No.: US 12,136,859 B2
(45) Date of Patent: Nov. 5, 2024

(54) ELECTRIC MACHINE

(71) Applicant: Optiphase Drive Systems, Inc., Keller, TX (US)

(72) Inventor: Arash Hassanpour, Tustin, CA (US)

(73) Assignee: Optiphase Drive Systems, Inc., Southlake, TX (US)

( * ) Notice: Subject to any disclaimer, the term of this patent is extended or adjusted under 35 U.S.C. 154(b) by 0 days.

(21) Appl. No.: 17/665,665

(22) Filed: Feb. 7, 2022

(65) Prior Publication Data
US 2022/0271591 A1 Aug. 25, 2022

Related U.S. Application Data

(60) Provisional application No. 63/146,652, filed on Feb. 7, 2021.

(51) Int. Cl.
| | |
|---|---|
| *H02K 3/18* | (2006.01) |
| *H02K 1/16* | (2006.01) |
| *H02K 1/24* | (2006.01) |

(52) U.S. Cl.
CPC .............. *H02K 3/18* (2013.01); *H02K 1/165* (2013.01); *H02K 1/24* (2013.01); *H02K 2213/03* (2013.01)

(58) Field of Classification Search
CPC ............ H02K 3/18; H02K 1/165; H02K 1/24; H02K 2213/03; H02K 3/12; H02K 21/14; H02K 3/28
USPC .......................................................... 310/179
See application file for complete search history.

(56) References Cited

U.S. PATENT DOCUMENTS

| | | | | |
|---|---|---|---|---|
| 3,780,324 | A * | 12/1973 | Greenwell | H02K 29/03 318/773 |
| 4,563,624 | A * | 1/1986 | Yu | H02J 9/00 307/64 |
| 4,642,502 | A * | 2/1987 | Carpenter | H02K 1/2781 310/216.013 |
| 6,351,095 | B1 * | 2/2002 | Edelson | H02P 27/08 318/807 |
| 11,646,618 | B2 * | 5/2023 | Sadeghi | H02K 1/2773 310/152 |
| 2003/0173931 | A1 * | 9/2003 | Edelson | H02K 3/28 318/801 |
| 2007/0018525 | A1 * | 1/2007 | Cai | B60L 50/16 310/201 |
| 2010/0156230 | A1 * | 6/2010 | Wolf | H02K 3/28 310/195 |
| 2010/0213782 | A1 * | 8/2010 | Nashiki | H02K 29/03 310/195 |
| 2010/0219788 | A1 * | 9/2010 | Edelson | H02P 25/22 318/801 |
| 2022/0271591 | A1 * | 8/2022 | Hassanpour | H02K 3/12 |

FOREIGN PATENT DOCUMENTS

CN 112398253 * 2/2021

* cited by examiner

*Primary Examiner* — Ahmed Elnakib
(74) *Attorney, Agent, or Firm* — Darrell G. Mottley

(57) ABSTRACT

A multi-phase electric machine includes a stator core defining slots and hairpins coils disposed of in the slots and selectively joined at connections to form windings is provided. The present invention also includes a round-wide double-layer distributed winding arrangement for the multi-phase machine. The winding arrangements are winding with non-integer slots per pole per phase.

15 Claims, 8 Drawing Sheets

ELECTRIC MACHINE

CROSS REFERENCE TO RELATED APPLICATIONS

The present application is claims priority to provisional application No. 63/146,652 filed Feb. 7, 2021, the contents therein is incorporated by reference in its entirety.

FIELD

The present disclosure relates to electric machines and more specifically to electric machines that include specific arrangements of the windings for five-phase electric machines.

BACKGROUND

The popularity and widespread use of an electrical machine has risen in recent years. Electric machines are used in many applications such as motor vehicles, passenger cars, electric cars, hybrid electric vehicles, electric and hybrid electric aircraft, drones, vertical take-off and landing (eV-TOLs), trucks, various types of industrial equipment, and various home appliances. Three-phase Induction motor is mostly used in many industrial, commercial and residential applications because of the cheaper cost, less maintenance required, robust operation and mainly due to the three-phase supply is easily available at any location.

These machines use a three-phase winding system in the stator to create a rotating magnetic field. An electric motor with multiphase supply (more than three-phase supply) has various advantages such as high fault tolerance characteristic, high torque density, reduced torque ripple, greater reliability, improved noise characteristic and low maintenance. Higher number of phases increase reliability by its fault tolerant nature. Therefore, electric machines can still operate by losing one or more phases.

Conventional five-phase electric machines use a distributed winding with the same number of coils over all poles and integer slot per pole per phase (q) or a concentrated winding with fractional slot per pole per phase. The issue with this type of winding is third harmonics of the back-emf which increases the peak of the back-emf and limits the constant torque region and maximum speed of the machine.

BRIEF SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Various aspect of the present disclosure relates to a multi-phase electric machine, including a stator core; and a rotor disposed within the stator core; the rotor having poles thereon; the stator core including non-integer slots per pole per phase being circumferentially arranged around the rotor; a plurality of windings disposed in the stator core; wherein the windings are arranged with the non-integer slots per pole per phase and the winding of each phase is different between two consequent poles.

In another aspect, the multi-phase electric machine may include comprises five phases. In yet another aspect, the multi-phase electric machine windings may have a fractional coil pitch. In yet another aspect, the multi-phase electric machine may have a round-wire double-layer winding arrangement. In yet another aspect, the multi-phase electric machine may have a hairpin winding arrangement. In yet another, aspect, the multi-phase electric machine may include a rotor selected from a group comprising one of a surface mount type, a W-type, a delta-type, multi-layer type, a V-type, double V type, Bar type and a U-type and any combination of them.

Various aspect of the present disclosure relates to a multi-phase electric machine, that include specific arrangements of the windings for five-phase electric machines installable in various motor vehicles, such as passenger cars, electric cars, hybrid electric vehicles, electric and hybrid electric aircraft, drones, vertical take-off and landing (eV-TOLs) and trucks, various types of industrial equipment, and various home appliances, and relates to motor systems comprising a five-phase motor and an inverter for driving it.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
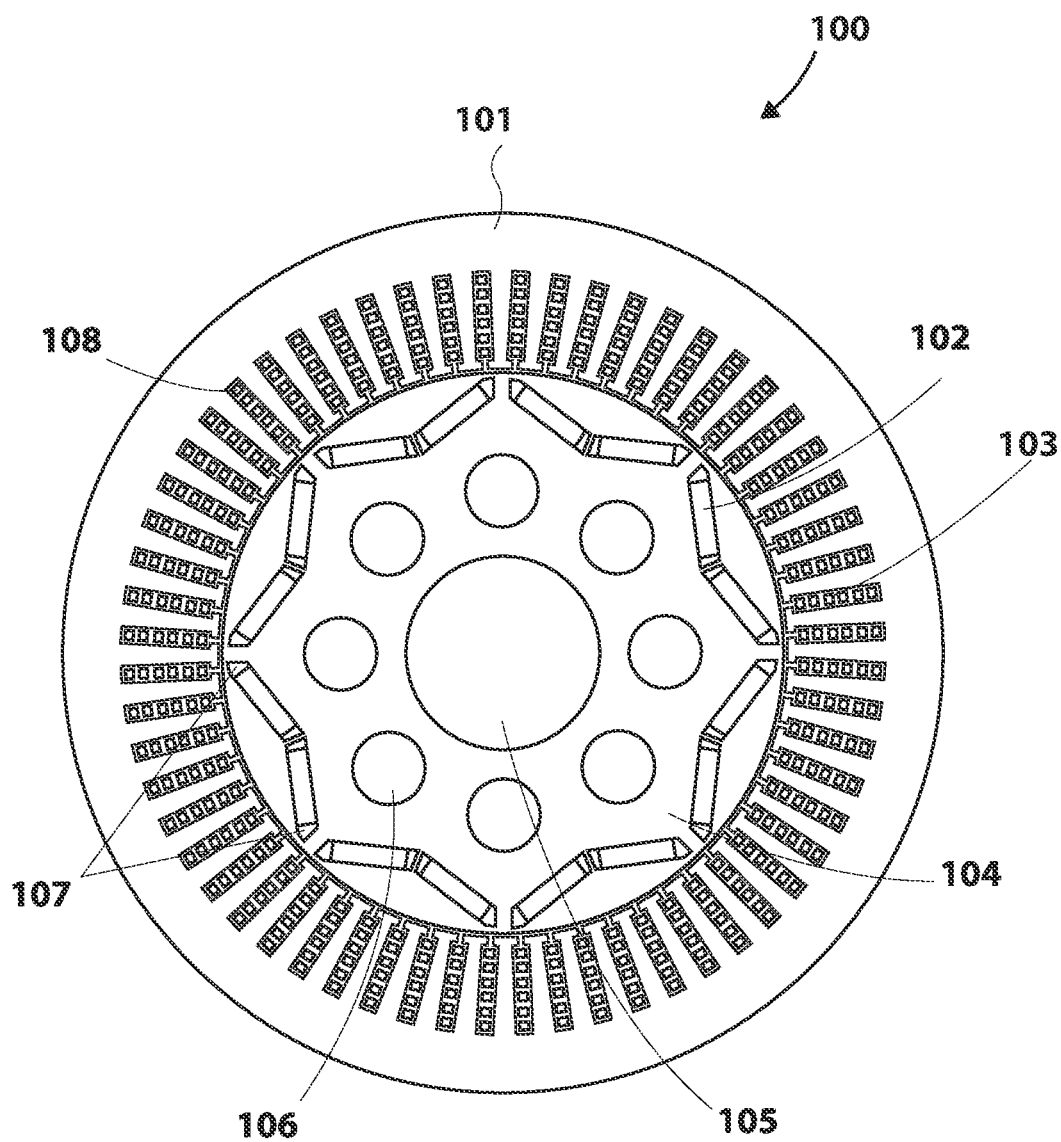
FIG. 1 illustrates a typical electric machine.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

An aspect of the specification provides a winding arrangement for the multi-phase electric machine includes a stator core and windings disposed of in the core. The windings are arranged in five phases with non-integer slots per pole per phase.

Figure 2:
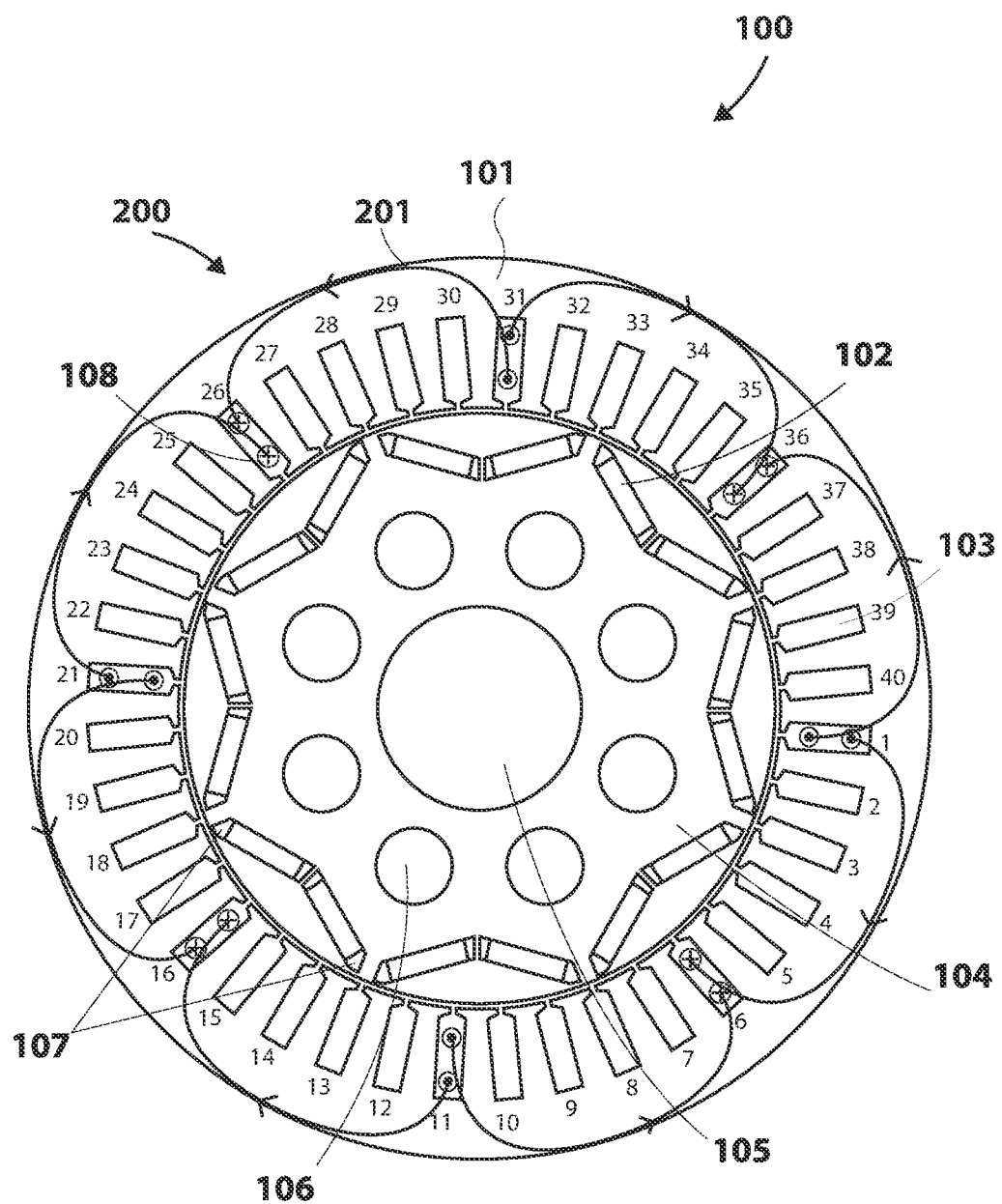
FIG. 2 illustrates a conventional five-phase electric machine using a distributed winding with the same number of phase winding over all poles and integer slots per pole per phase (q).

Referring to FIGS. 1, 2, 4, 5 and 8, the electric machine 100 includes a housing that encloses a stator 101 and a rotor 104. The rotor 104 is supported for rotation within a shaft 105. The stator 101 further includes windings 200 and slots 103 and the rotor includes permanent magnets 102 that interact with windings of the stator 101 to generate rotation of the rotor 104 when the electric machine 100 is energized. The permanent magnet 102 further includes a pair of air pockets 107. A venting hole 106 for a continuous stream of air to and from the motor is provided. FIG. 2 illustrates a conventional five-phase electric machine 100 using a distributed winding 200 with the same number of coils 201 over all poles and integer slot 103 per pole per phase (q) or a concentrated winding with fractional slot 103 per pole per phase. The stator 101 defines slots 103 circumferentially arranged around the rotor 104 and extending outward. The slots 103 may be equally spaced around the circumference and extend axially. In the illustrated embodiment, the core defines 40 slots and has eight poles. The five-phase electric machine 100 includes a distributed winding 200 with the same number of coils 201 over all poles and integer slot per pole per phase (q).

The winding arrangement according to the FIG. 2 leads to the third harmonics of back-emf which increases the peak of back-emf and limits the constant torque region and maximum speed of the machine.

Figure 3:
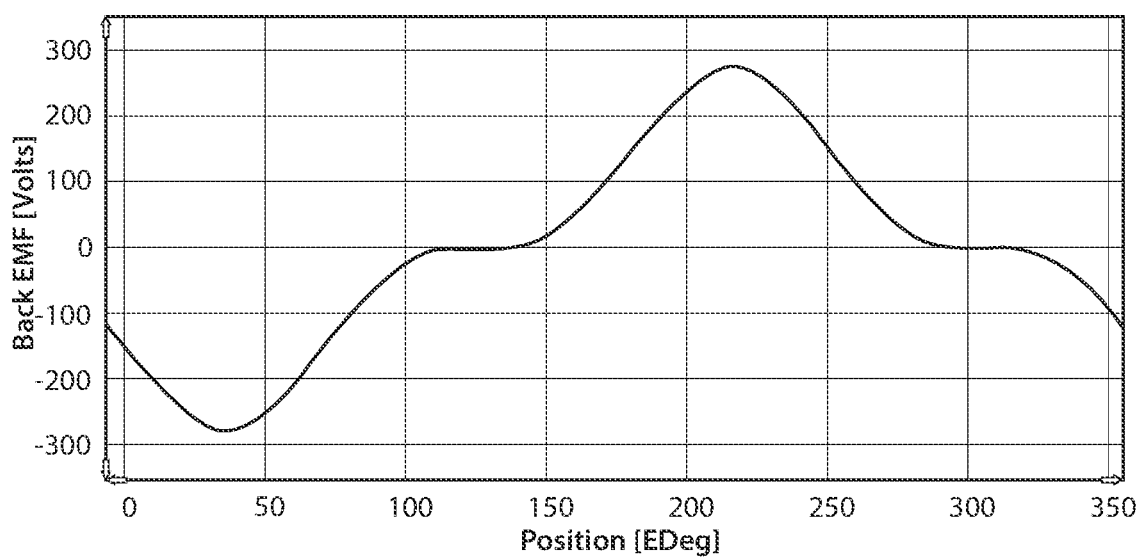
FIG. 3 is a graph schematically illustrating an increased peak of back-emf of conventional winding shown in FIG. 2.

FIG. 3 is a graph schematically illustrating an increased peak of back-emf of conventional winding 200 of the five-phase electric machine 100 shown in FIG. 2. It is apparent from the figure that the back-emf in volts shown on the vertical axis of FIG. 3 fluctuates with respect to the rotational position in degrees of the rotor 104 around the stator 101, shown by the horizontal axis of FIG. 3. FIG. 3 schematically illustrates the fluctuations of the back-emf in volts from negative peaks to positive peaks within one rotation (0-360 degrees) of the rotor 104 around the stator 101.

Figure 4:
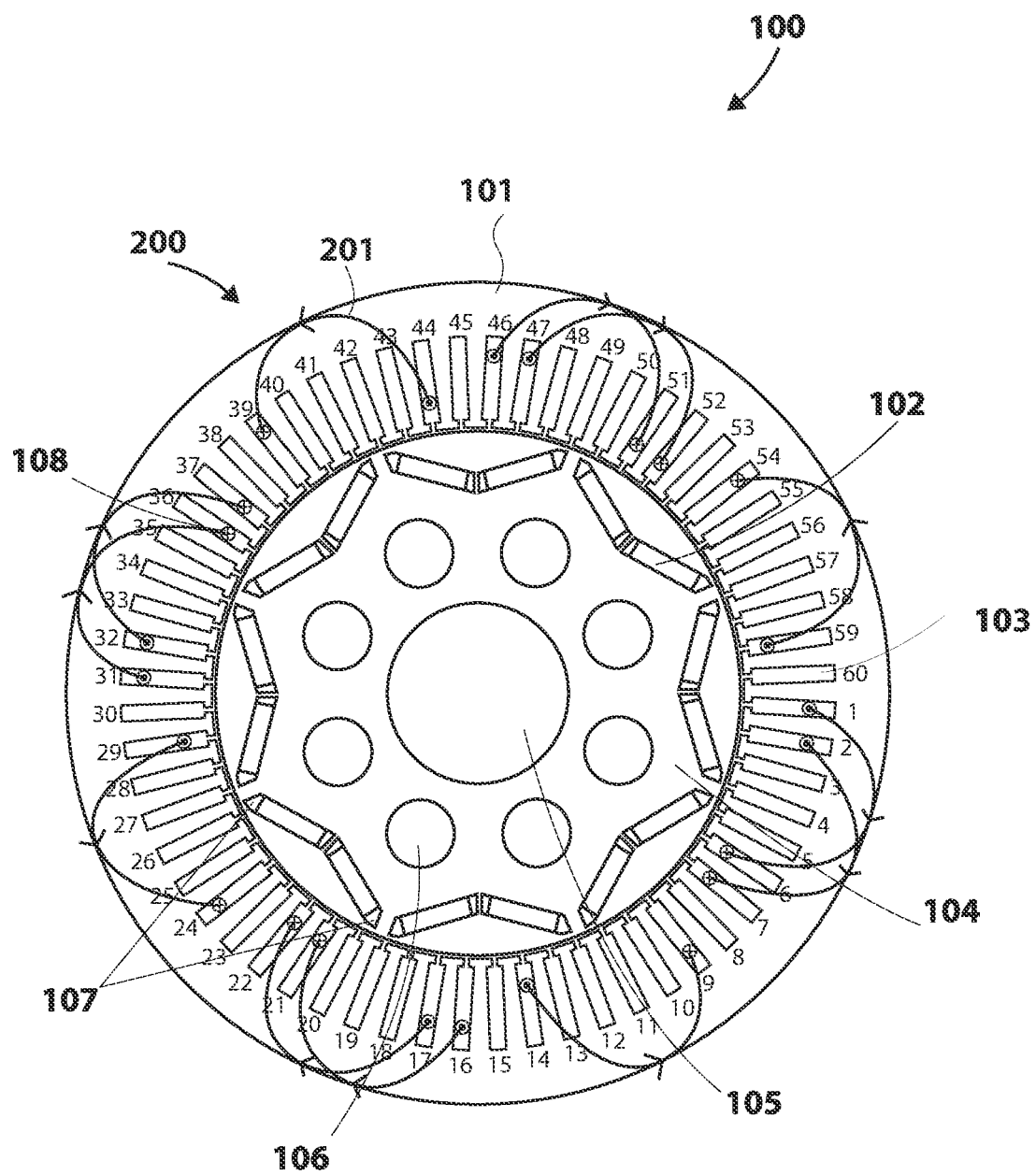
FIG. 4 illustrates a winding arrangement of one phase in a five-phase machine (round-wire double-layer distributed winding) in accordance with some embodiments.

FIG. 4 illustrates a winding arrangement of one phase in a five-phase machine 100 (round-wide double-layer distributed winding) in accordance with some embodiments. The stator 101 defines slots 103 circumferentially arranged around the rotor 104 and extending outward. The slots 103 may be equally spaced around the circumference and extend axially. In the illustrated embodiment, the core defines 60 slots and has eight poles. The five-phase electric machine 100 includes a winding 200 with non-integer slot per pole per phase, for example q=1.5, where winding has fractional coil pitch, here five slots, and there are two different winding arrangements for consequent poles. An example is a motor with five phases (m=5) in stator with currents of 72 deg apart. And a rotor with a permanent magnet. In this example there are 8 poles (p=8) in the rotor and Q=60 slots in the stator. A fractional (non-integer) slot per pole per phase number q=1.5 (slot per pole per phase).

The winding arrangement according to the FIG. 4 the winding 200 can be round wire double-layer winding. Each winding 200 has 2 m coils 201 on one pole and m coils on the next pole. The coil threw is 5. For example, phase 1 returns from slot 1 and goes in from slot 6, again returns from slot 2 and goes in slot 7. For the next pole it goes in 9 and returns from slot 14. The stator may include more or fewer slots and/or poles in other embodiments.

Figure 5:
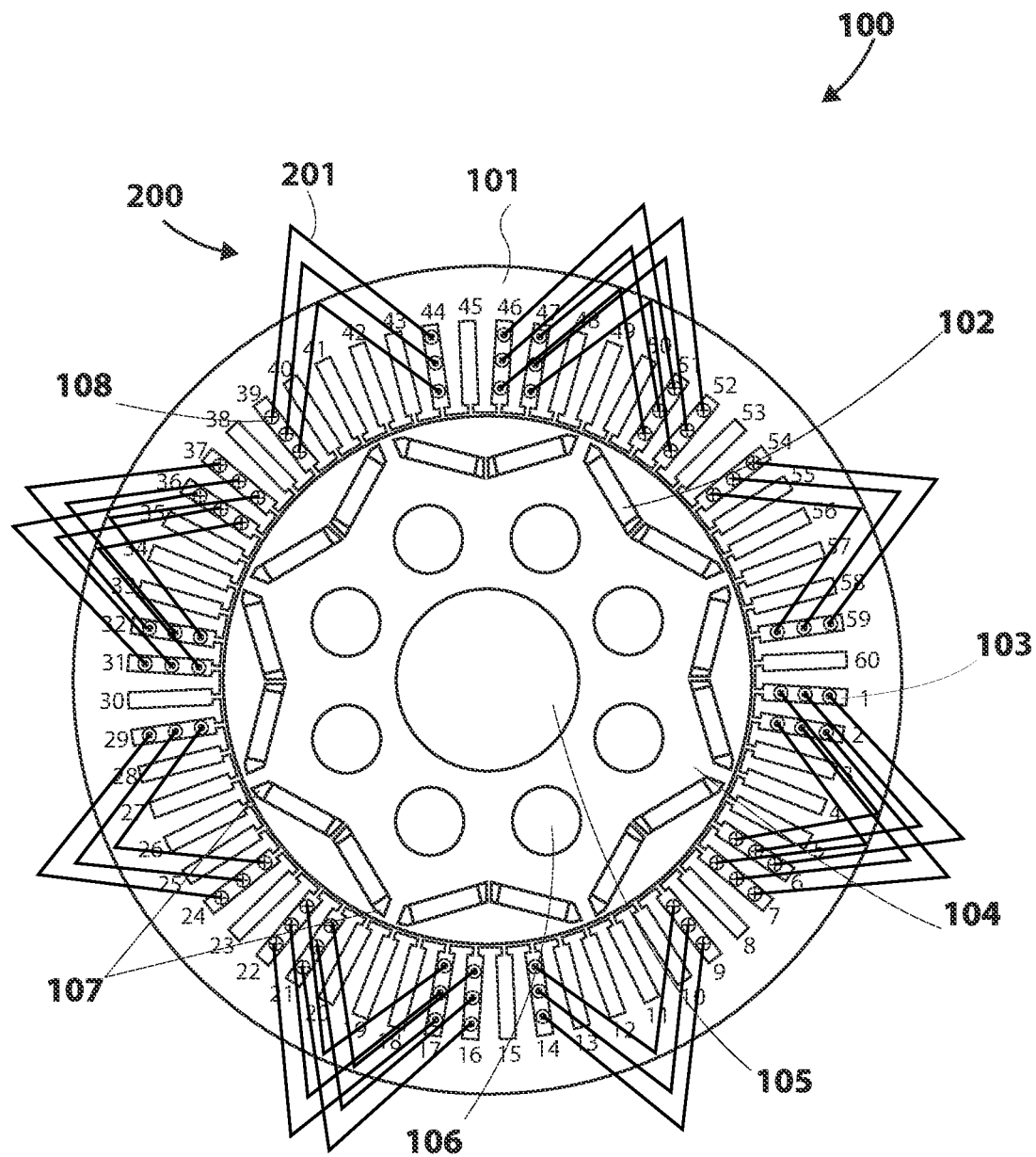
FIG. 5 illustrates a winding arrangement of one phase in a five-phase machine (hairpin winding 6 conductor) in accordance with some embodiments.

The winding arrangement according to the FIG. 5 winding 200 can also be a hairpin winding. A hairpin winding 200 with 6 conductors in each slot but there can be a different number of conductors per slot, 2, 4, 6, 8, . . . 2n where n is a natural number.

Figure 6:
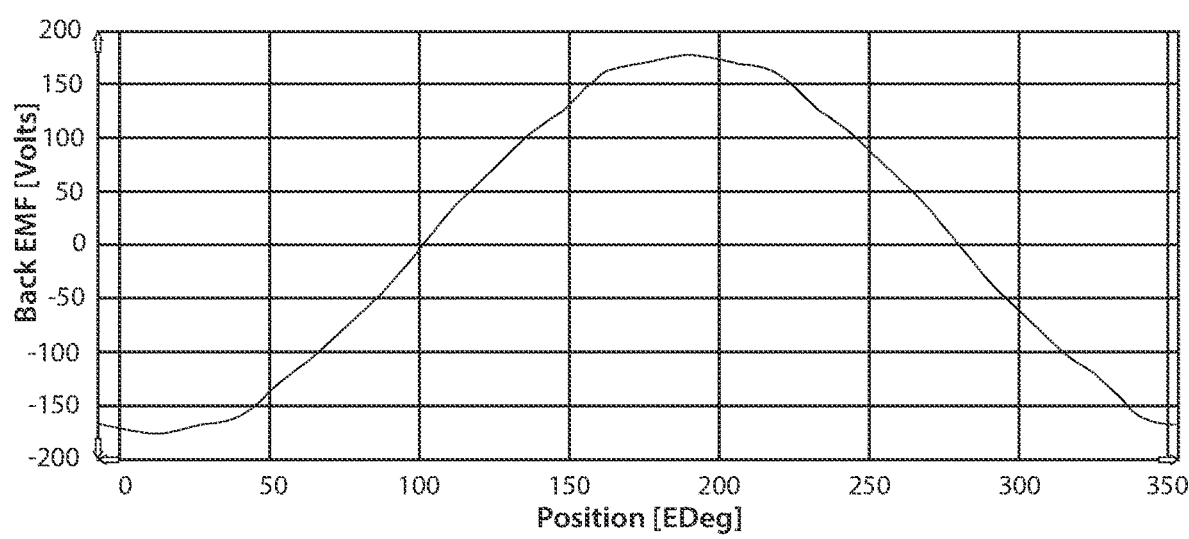
FIG. 6 is a graph schematically illustrating changes in the peak of back-emf of winding arrangements shown in FIGS. 4 and 5.

FIG. 6 is a graph schematically illustrating changes in the peak of back-emf of winding arrangements shown in FIGS. 4 and 5. The graph shows the back-emf in volts steadily rising and thereafter decreasing as the rotor 104 completes one rotation around the stator 101, denoted in degrees. A similar trajectory of back-emf in volts ensues with every rotation of the rotor 104 around the stator 101. With different rotation speeds of the rotor 104 around the stator 101, the back-emf will exhibit different magnitudes but will be consistent for the same speed seldom fluctuating from negative to positive values. The motor has a flat top of the back-emf and smaller peak. Therefore, the machine has extended torque-speed range and higher maximum speed.

Figure 7:
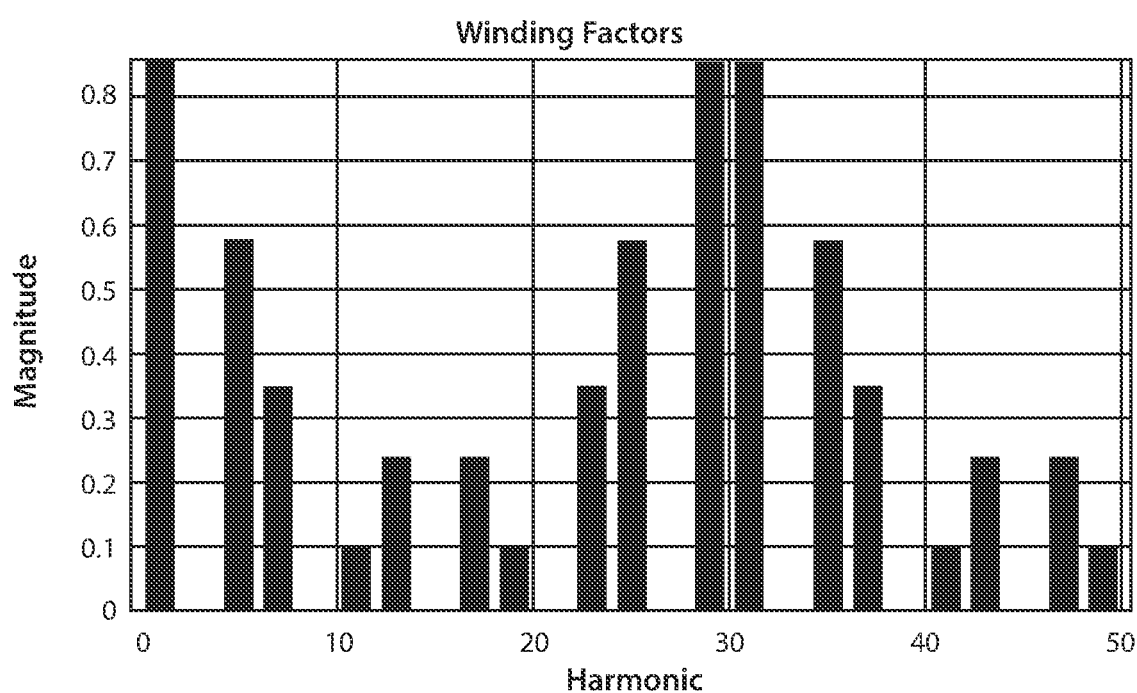
FIG. 7 is a graph schematically illustrating changes in the winding factor of winding arrangements shown in FIGS. 4 and 5.

FIG. 7 is a graph schematically illustrating changes in the winding factor of winding arrangements shown in FIGS. 4 and 5. The winding factor distribution for the third harmonics is zero. The reduction in third harmonics could also decrease the peak of back-emf. Therefore, the machine provides an extended torque-speed range for operation in varied operation conditions without the need for alternate gearing or motors.

Referring to FIGS. 4 and 5, an electric machine 100 may be used in a vehicle such as a fully electric vehicle or a hybrid-electric vehicle. The electric machine 100 may be referred to as an electric motor, a traction motor, a generator, or the like. The electric machine 100 may be a permanent magnet machine, an induction machine, or the like. In the illustrated embodiment, the electric machine 100 is a five-phase alternating current (AC) machine. The electric machine 100 is capable of acting as both a motor to propel the vehicle and as a generator such as during regenerative braking.

Figure 8:
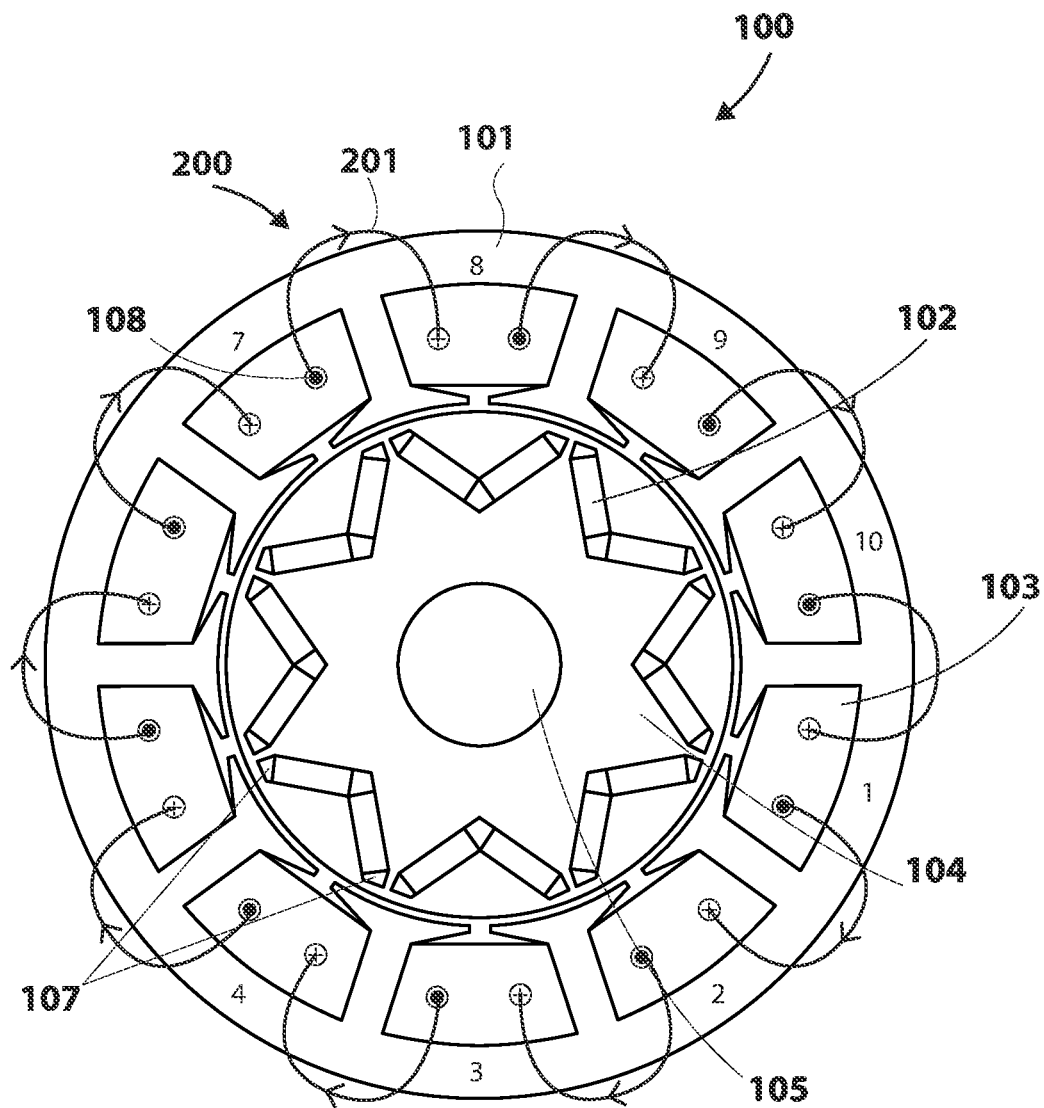
FIG. 8 illustrates a conventional five-phase electric machine using a concentrated winding with fractional slots per pole per phase.

FIG. 8 illustrates a conventional five-phase electric machine 100 using a concentrated winding 200 with the same number of coils 201 over all poles and a concentrated winding with fractional slot 103 per pole per phase. The stator 101 defines slots 103 circumferentially arranged around the rotor 104 and extending outward. The slots 103 may be equally spaced around the circumference and extend axially. In the illustrated embodiment, the core defines 10 slots. The five-phase electric machine 100 includes a concentrated winding 200 with fractional slots per pole per phase. The winding arrangement 200 can be used for synchronous reluctance and induction machines.

The electric machine 100 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The rotor 104 can be selected from a group consisting of but not limited to a surface mount type, a W-type, a delta-type, multi-layer type, a V-type, double V type, Bar type and a U-type and any combination of them.

The traction battery may be electrically connected to one or more power electronics modules. The power electronics modules may be electrically connected to the electric machines 100 and may provide the ability to bi-directionally transfer electrical energy between the traction battery and the electric machine 100. For example, a typical traction battery may provide a DC voltage while the electric machine 100 may require a three-phase (AC) voltage. The power electronics module may include an inverter that converts the DC voltage to a three-phase AC voltage as required by the electric machine 100. In a regenerative mode, the power electronics module may convert the multi-phase AC voltage from the electric machine 100 acting as a generator to the DC voltage required by the traction battery.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically.

A device or structure that is "configured" in a certain way is configured in at least that way, but may also be configured in ways that are not listed. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A multi-phase electric machine, comprising;
   a stator core; and
   a rotor disposed within the stator core; the rotor having poles thereon; the stator core including non-integer slots being circumferentially arranged around the rotor; a plurality of windings disposed in the stator core; wherein the windings are arranged with the non-integer slots per pole per phase thereby reducing third harmonics of a back-EMF substantially to zero;
   wherein a winding factor distribution of the third harmonic is a zero.

2. The multi-phase electric machine according to claim 1, wherein the electric machine further comprises five phases.

3. The multi-phase electric machine according to claim 1, wherein the windings have a fractional coil pitch.

4. The multi-phase electric machine according to claim 3, wherein the electric machine has five phases.

5. The multi-phase electric machine according to claim 1, wherein the windings further comprise a round-wide double-layer winding arrangement.

6. The multi-phase electric machine according to claim 5, wherein the electric machine has five phases.

7. The multi-phase electric machine according to claim 1, wherein the windings further comprise a hairpin winding arrangement.

8. The multi-phase electric machine according to claim 7, wherein the electric machine has five phases.

9. The multi-phase electric machine according to claim 1, wherein the rotor is selected from a group comprising one of a surface mount type, a W-type, a delta-type multi-layer, a V-type, interior type and a U-type.

10. A multi-phase electric machine, comprising;
    a stator core having at least non-integer slots being circumferentially arranged around a rotor having a plurality of poles; a plurality of windings disposed in the stator core; wherein the windings are arranged with the non-integer slots per pole per phase thereby reducing third harmonics of a back-EMF substantially to zero; wherein a winding factor distribution of the third harmonic is a zero.

11. The multi-phase electric machine according to claim 10, wherein the electric machine further comprises five phases.

12. The multi-phase electric machine according to claim 10, wherein the windings have a fractional coil pitch.

13. The multi-phase electric machine according to claim 10, wherein the windings further comprise a round-wide double-layer winding arrangement.

14. The multi-phase electric machine according to claim 10, wherein the windings further comprise a hairpin winding arrangement.

15. The multi-phase electric machine according to claim 10, wherein the rotor is selected from a group comprising one of a surface mount type, a W-type, a delta-type multi-layer, a V-type, interior type and a U-type.

* * * * *